United States Patent [19]

Hayashi et al.

[11] Patent Number: 5,065,320
[45] Date of Patent: Nov. 12, 1991

[54] CONTROL AND DISPLAY SYSTEM FOR A BATTERY POWERED VEHICLE

[75] Inventors: Takashi Hayashi; Junichi Hida; Kenji Suga; Yoshikazu Kurata, all of Kariya, Japan

[73] Assignee: Kabushiki Kaisha Toyoda Jidoshokki Seisakusho, Aichi, Japan

[21] Appl. No.: 423,450

[22] PCT Filed: Feb. 20, 1989

[86] PCT No.: PCT/JP89/00166

§ 371 Date: Sep. 27, 1989

§ 102(e) Date: Sep. 27, 1989

[87] PCT Pub. No.: WO89/07538

PCT Pub. Date: Aug. 24, 1989

[30] Foreign Application Priority Data

Feb. 19, 1988 [JP] Japan ............... 63-37911
Apr. 14, 1988 [JP] Japan ............... 63-92243

[51] Int. Cl.$^5$ .............. G06F 7/70; B60K 1/00; B60L 1/00; G01R 31/02
[52] U.S. Cl. .............. 364/424.01; 364/424.07; 364/424.04; 318/490; 180/65.1; 180/65.8; 307/9.1
[58] Field of Search .............. 364/424.07, 424.01, 364/424.03, 424.04, 550, 551.01; 318/225, 268, 490, 543; 280/1, 3, DIG. 5; 180/65.1, 65.8; 307/9.1, 10.1

[56] References Cited

U.S. PATENT DOCUMENTS

| | | | |
|---|---|---|---|
| 4,258,421 | 3/1981 | Juhasz et al. | 364/424.04 |
| 4,462,079 | 7/1984 | Ito et al. | 364/424.07 |
| 4,612,623 | 9/1986 | Bazarnik | 364/424.04 |
| 4,613,939 | 9/1986 | Paine | 364/424.04 |
| 4,739,482 | 4/1988 | Wrigge | 364/424.03 |

FOREIGN PATENT DOCUMENTS

| | | | |
|---|---|---|---|
| 56-66101 | 6/1981 | Japan | |
| 58-67327 | 11/1984 | Japan | 364/424.03 |
| 60-6599A | 1/1985 | Japan | |
| 60-52641 | 11/1985 | Japan | |
| 60-230014 | 11/1985 | Japan | 364/424.03 |
| 61-241803A | 10/1986 | Japan | |

Primary Examiner—Parshotam S. Lall
Assistant Examiner—E. J. Pipala
Attorney, Agent, or Firm—Burgess, Ryan & Wayne

[57] ABSTRACT

In a battery powered vehicle such as an forklift truck, control data is stored in a memory (39) by an operation of the keys (11a, 11b, 11c, 11d, 11e) on a control panel (10) mounted at the operation seat, and a part of the control data is selected by a control circuit (30) and transmitted to a travelling control circuit. The travelling control circuit controls a travelling motor (101) with the characteristics decided by the selected data and the selected control data is indicated on a display panel (12). A plurality of data used for maintenance administration, such as a cumulative travelling distance or cumulative operating hours, are stored in a memory and one of the data for maintenance administration is arbitrarily indicated on the display panel (12) and converted to meet the specified indication specification through the control circuit (30) by operation of the keys (11e) on said control panel (10). The control and display system according to the present invention allows an operator to change the operating characteristic of the vehicle, to indicate the control data, to select the data for maintenance administration, to convert the data in the specified indication specification, and to indicate the data on the display panel (12), by an operation of the control panel (10).

9 Claims, 13 Drawing Sheets

| | KEY OPERATION | | 12a | 12b INDICATION | BUZZER |
|---|---|---|---|---|---|
| FIG. 6a | MODE 11a | 12d ▎1 2 3 | 01 | ▰ ▯▯▯▯ | |
| FIG. 6b | TYPE | 1 ▎2 3 | 01 | ▰ ▰ ▯▯▯ | |
| FIG. 6c | MODE 11a | 1 ▎2 3 | 02 | ▰ ▰ ▯▯▯ | |
| FIG. 6d | △ 11b | 1 ▎2 3 | 02 | ▰ ▰ ▰ ▯▯ | |
| FIG. 6e | △ 11b | 1 ▎2 3 | 02 | ▰ ▰ ▰ ▰ ▯ | |
| FIG. 6f | | | 02 | ▰ ▰ ▰ ▰ ▯ | BUZZER ON |

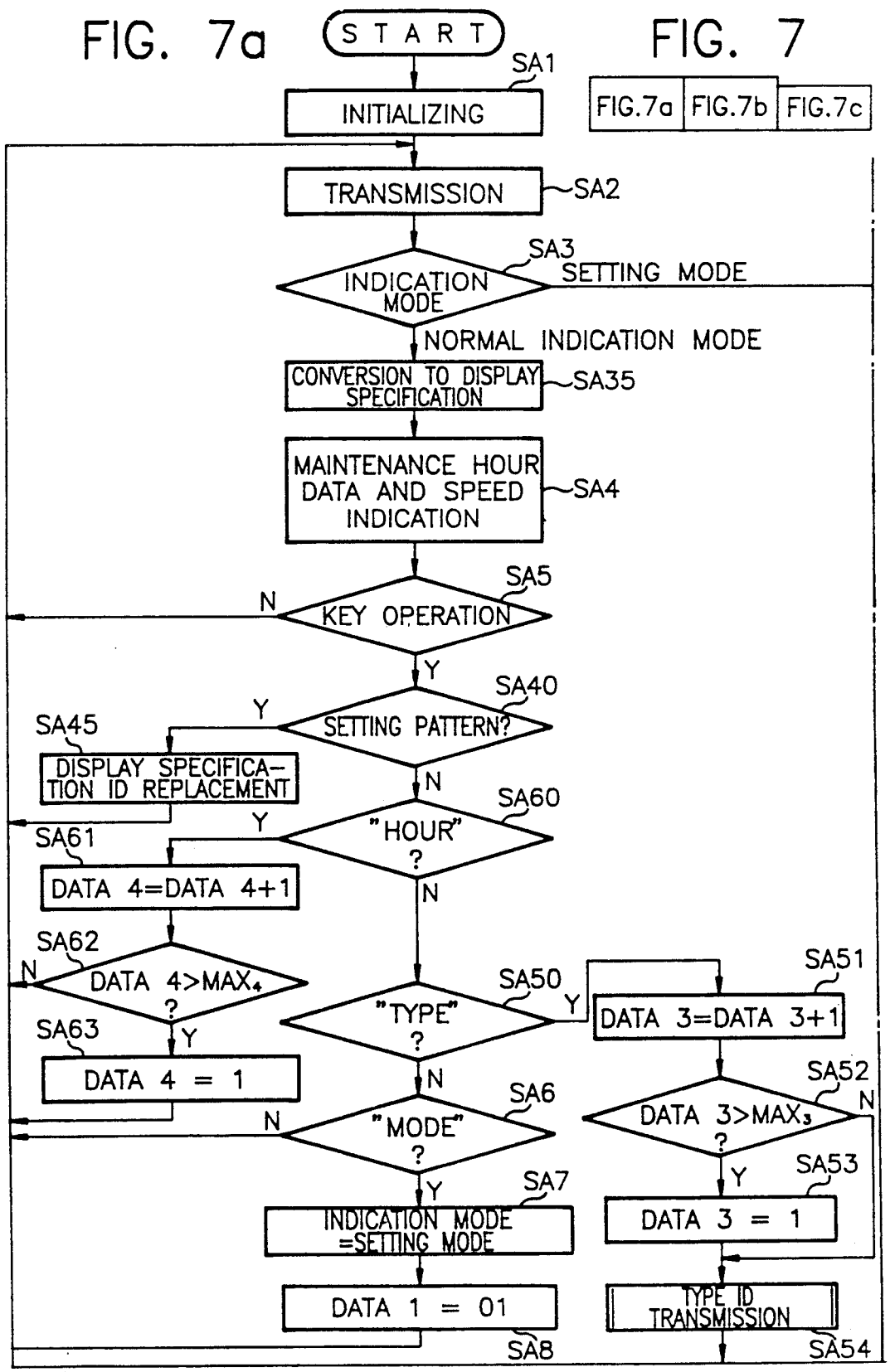

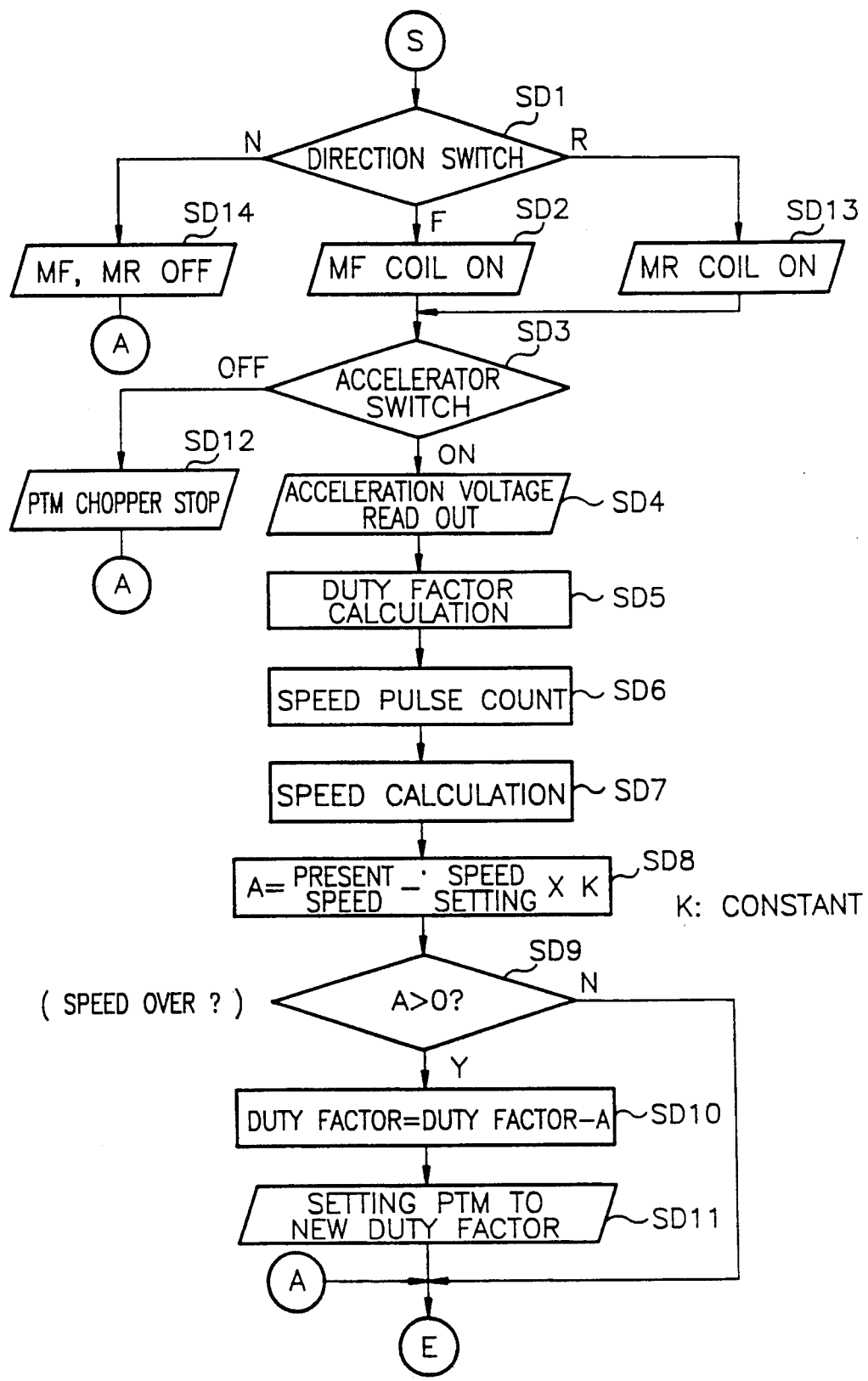

CONTROL AND DISPLAY SYSTEM FOR A BATTERY POWERED VEHICLE

DESCRIPTION

1. Technical Field

The present invention relates to a battery powered vehicle such as a forklift truck, and particularly, to a control and display system for a battery powered vehicle by which the operator can operate an electric control device built in the vehicle body to change the operational characteristic of the vehicle and to display data, such as respective setting values or parameters of the operational characteristic of the vehicle, a cumulative total of the hours operated by the vehicle, and a cumulative total of the distance travelled by the vehicle, on a display panel.

2. Background Art

Conventionally, forklift trucks, for example, are designed so that the operator can arbitrarily set parameters for controlling the characteristic of an acceleration during starting and running (hereafter called "travelling power") or parameters for cargo handling power, such as the tilt speed and lift speed of the forklift, according to the kind of cargoes handled and the operating conditions, since forklift trucks are used in various operating environment, handle various types of cargoes and are driven by operators having various degrees of skill.

FIGS. 14(a), (b) are schematic illustrations of a circuit for adjusting the travelling power and a cargo handling power, respectively, of a conventional type forklift truck. The travelling power is adjusted, as shown in FIG. 14a, by using a variable resistance 110 disposed on a control panel of the vehicle, and the cargo handling power is adjusted, as shown in FIG. 14(b), by using a plurality of trimmers 120 disposed on a control board. This adjustment by using trimmer disposed on the control board, however, is cumbersome and time consuming, since the control board is accommodated inside the vehicle body. Further, the trimmer system is inconvenient in that it is difficult for the operator to frequently adjust the system, even though such adjustments must be often made to obtain settings appropriate to the kind of work to be carried out and the degree of skill of the operator. The variable resistance for adjusting the travelling power is disposed in front of the operators seat and is easy to operate, but it is difficult to determine an exact acceleration value setting by using a scale of the variable resistance, and this causes problems for operators with a lower degree of skill. Also, it is difficult to make the variable resistance system watertight.

Therefore, the object of the present invention is to provide a control system for a battery powered vehicle by which an operator can easily, quickly and accurately adjust the travelling power and the cargo handling power, to settings appropriate for the current working conditions and degree of skill of the operator.

A vehicle such as a forklift truck is used for various types of work under various travelling or cargo handling operating conditions, and thus it is necessary to obtain operating data for each operating condition, such as the hours of operation by the vehicle to arrange the working hours and schedule maintenance for parts replacement and battery charging, etc.

Conventionally, industrial vehicles such as forklift trucks are equipped with hour meters which measure the hours of operation of batteries as a rough indication of hours of operation by the vehicle, but the conventional hour meter measures only the hours for which a key switch of the vehicle is in the ON state, namely, it measures only the ON time of the key switch. Consequently, the indications of the hour meter are the same for when the forklift is used for travelling or for cargo, and when the forklift is not used but the key switch is left in the ON state. In practice, these two conditions cause great difference in the electric consumption of the battery, wear of parts, and working volume, etc., and therefore, it is not appropriate to schedule maintenance or working hours on the basis of the indication of the hourmeter.

Therefore, another object of the present invention is to provide a display system which can measure the various hours of operation under different conditions, such as electric consumption, and can indicate the hours measured on a single display device.

DISCLOSURE OF THE INVENTION

These and other objects are achieved by a control and display system according to the present invention, which is characterized in that it comprises:

a drive means;

a control data input means for inputting a plurality of control data;

a control data storage means for storing the plurality of control data input by the control data input means;

an operation detecting means for detecting a plurality of types of vehicle operation controlled by an operator;

an operating data collecting means for measuring a plurality of operating data in accordance with the detecting operation of the operation detecting means;

an operating data storage means for storing the operating data measured by the operating data collecting means;

a selection means for selecting a portion of the plurality of control data stored in the control data storage means, and selecting a portion of the plurality of operating data stored in the operating data storage means;

a drive control means for controlling the drive means in accordance with the control data selected by the selection means; and a display means for indicating the control data and the operating data selected by the selection means, Whereby the travelling power and cargo handling power, etc., characteristics of a battery powered vehicle can be easily and quickly set by an operator, and the settings of the characteristics and the operating data for each operating condition of the vehicle can be visually confirmed at a single display device.

BRIEF DESCRIPTION OF THE DRAWINGS

FIGS. 6(a)–(f) show the method of setting the travelling acceleration by operation of the keys of the switch panel 11;

FIG. 13 is a flow diagram showing the travelling control process of the travelling control circuit; and, FIGS. 14(a), (b) show the method of adjusting the travelling and cargo handling power according to the conventional system.

BEST MODE OF CARRYING OUT THE INVENTION

Figure 1:
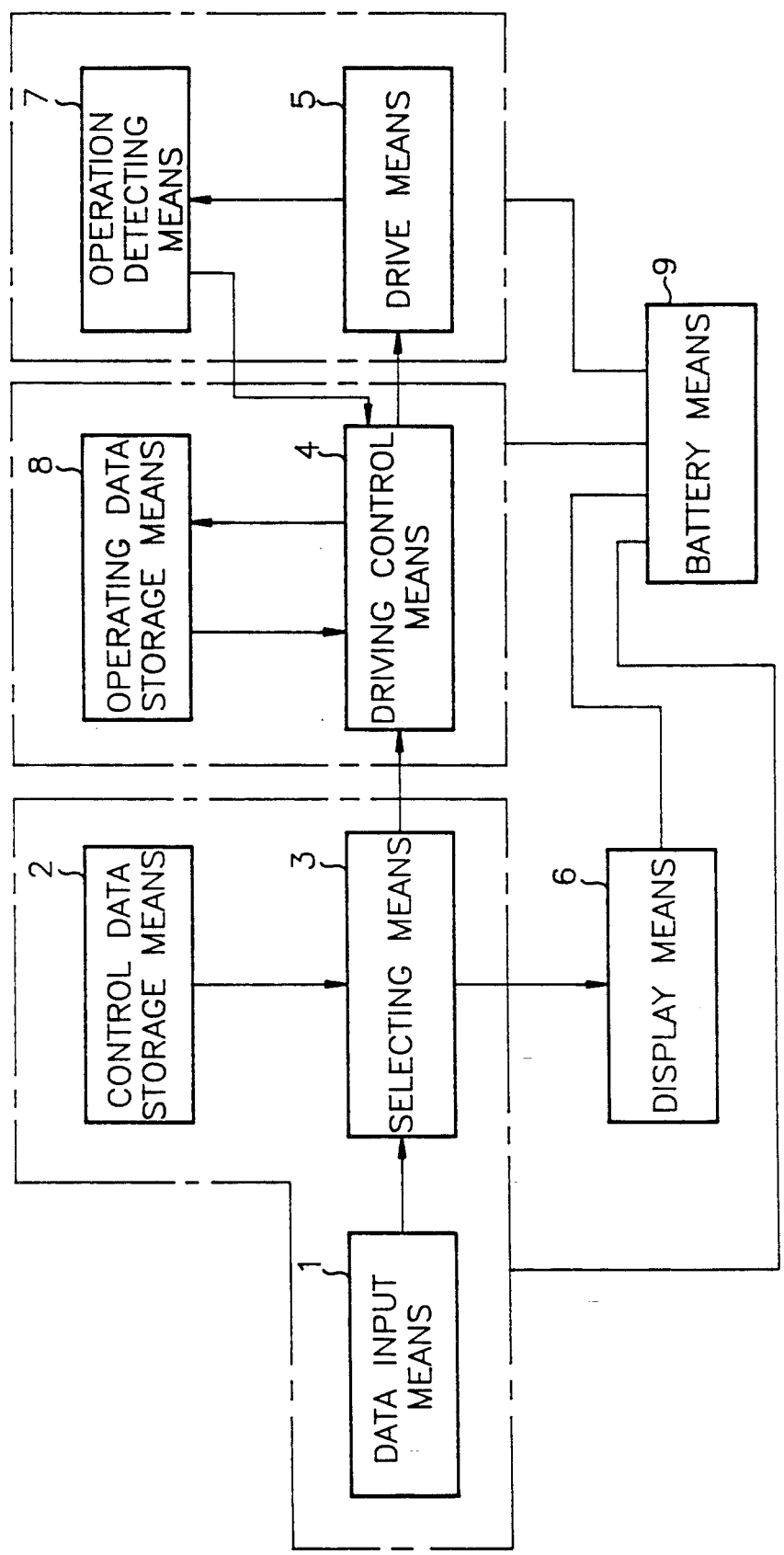
FIG. 1 is a block diagram of the control and display system of the present invention.

FIG. 1 is the functional block diagram of the present invention. In FIG. 1, a plurality of control data is input by the control data input means 1.

The selecting means 3 stores control data received from the input means 1 in the control data storage means 2, and selects a part of the control data and transmits that data to the drive control means 4, which controls the drive means 5. The drive means 5 comprises, for example, electric motors and is equipped with the operation detecting means 7 which detects the operation of the drive means 5. The drive control means 4 controls the drive means 5 in accordance with the control data transmitted from the selecting means 3, and produces operating data which is stored in the operating data storage means 8 in accordance with an operation detecting signal from the operation detecting means 7. The operating data is transmitted to the selecting means 3, in accordance with requests by the selecting means 3, via a travelling control means, and is indicated on the display means. A battery means 9 is connected and supplies electric power to all of the above means, including the drive means 5.

The embodiments of the present invention will be explained with reference to the accompanying drawings.

Figure 2:
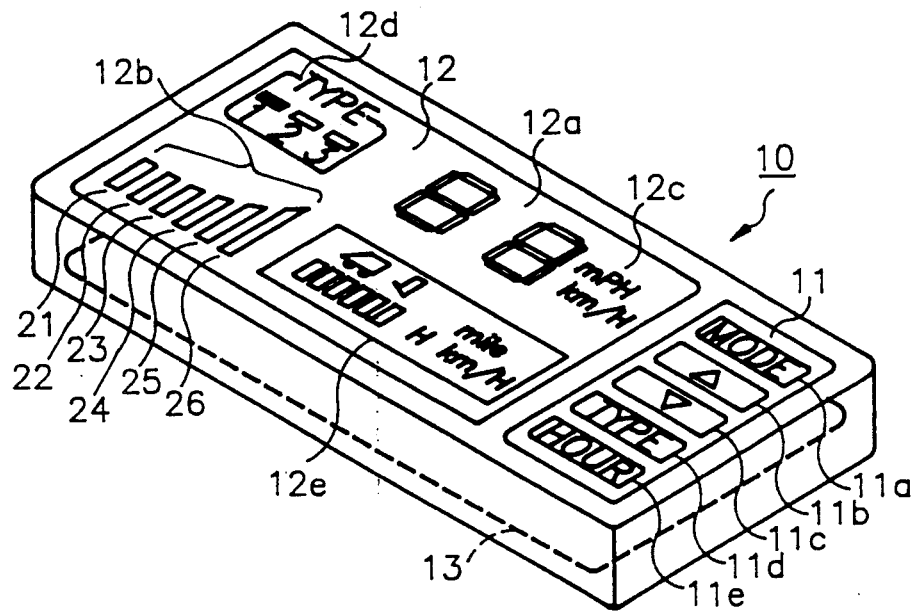
FIG. 2 is a perspective view of the control panel 10.

FIG. 2 is a perspective view of the control panel 10 of the forklift truck according to an embodiment of the present invention. In the drawing, the input means is shown as a switch panel 11, which is a touch key type switch panel equipped with a mode key 11a for setting the parameters for travelling power and cargo handling power, data input keys 11b and 11c, a type key 11d for changing the control modes, and an hour key 11e for changing the indication of the maintenance administration data including the operating data. When the mode key 11a is operated, the setting modes are switched so that the modes can be selected cyclically in the following order, maximum travelling speed setting mode→maximum travelling acceleration setting mode→lift speed setting mode→tilt speed setting mode→maximum travelling speed setting mode—. In the maximum travelling speed setting mode, the maximum travelling speed of the forklift truck is set, and in the maximum travelling acceleration control mode the acceleration upon starting or during travelling is set. In the lift speed setting mode and the tilt speed setting mode, the speed of the lifting motion and the speed of the tilting motion of the fork can be set respectively, and in the steering power setting mode, the steering force is adjusted. Each of the above modes is given a mode ID number "01", "02", . . . from the maximum travelling speed mode in the order shown above, and several setting values (6 setting values in this embodiment) are prepared as control data for each setting mode. For example, in the maximum travelling speed setting mode (mode ID "01"), six maximum travelling speed settings of 4 km/h, 5 km/h, 6 km/h, 8 km/h, 9 km/h and 11 km/h can be selected. The setting value in the respective setting mode can be selected by operating the data input key 11b or 11c. Each of the six setting values are given a setting value ID "1"–"6" and the setting value ID can be selected cyclically in the order, "1"→"2"—"6"→"1"—by operating the data input key 11b and in the order "6"→"5"→"1"→"6" by operating the data input key 11c. Further, the predetermined sets of the setting values for the respective setting modes are given in accordance with the type of the work and the skill of the operator (three sets are given in this embodiment) and each set is given a type ID "1"–"3" so that the required setting values can be selected by the type key 11d. Each setting value is given a setting value ID "1"–"6", and the type ID can be selected cyclically in the order, "1"→"2"→"3"→"1"—by operating the type key 11d.

The display means is a display unit such as a liquid crystal display panel which can indicate data in both a normal indication mode and in a setting mode, as explained later. The display means comprises a display segment 12a, a display segment 12b which comprises six rectangular display elements 21, 22, 23, 24, 25, 26, a display segment 12c for indicating a speed in "km/h" or "mph" at the upper right portion thereof, and a display part 12e for indicating the maintenance administration data explained later. On the display panel 12, the present travelling speed is indicated by two digits at the display segment 12a in the normal indication mode, but in the setting mode, on the display panel 12, the mode ID number selected by the mode key 11a of the switch panel 11 is indicated at the display segment 12a, and the setting ID number is indicated at the display segment 12b in accordance with the mode indicated at the display segment 12a. Also, at upper left portion of the display panel, the type ID selected by the type key is indicated by the display element 12d. The type ID is indicated at the display element 12d regardless of whether the display panel 12 is in the normal indication mode or in the setting mode, but this may be designed so that the type ID is indicated only in the setting mode.

In FIG. 2, type ID "1" is indicated at the display segment 12d, the mode ID "02" for the maximum travelling acceleration setting mode is indicated at the display segment 12a, and the setting value ID "1" is indicated at the display segment 12b by illumination of the display segment 21. The number of the illumination display element 21–26 is equal to the setting value ID number, and thus the setting value ID of the present setting can be determined by counting the number of display elements illuminated.

The maintenance administration data indicator 12e is provided on the display panel 12. This indicator 12e, cyclically shows the cumulative total of the hours for which the key switch of the vehicle is ON, a cumulative total of the distance travelled, a cumulative total of the hours of travelling and a cumulative total of the hours of cargo handling (a cumulative total of the time for which the cargo handling motor is turned ON) when the hour key 11e of the switch panel 11 is operated.

Among the above data, the cumulative hours on of the key switch, the cumulative hours of travelling by the vehicle, and the cumulative hours of cargo handling operation are indicated in hours, and the cumulative distance travelled is indicated in km or miles. This last requirement for changing the measuring unit together with the numerical value of the speed indicated at 12a and the cumulative distance travelled indicated at 12e is provided to cope with the different measuring units used in various countries.

The system is designed so that the numerical value and measuring unit can be changed by the control circuit 30, which converts the numerical value according to the specified measuring unit, i.e., miles or km, and in accordance with the tire size of the vehicle used. These conversion is based on the specification data built into the control circuit 30. Normally, there is no need for the operator to adjust the indication of the display unit, since the adjustment is made on dispatch from the factory, but if it becomes necessary to change the specification of the display, the specification data can be selected by operating the key of the switch panel 11, without modification of the circuit accommodated in the vehicle body. This specification data can be selected by operating the keys of the switch panel 11 in a predetermined order to establish a display specification selection mode in which the display specification can be changed by the data input keys 11b and 11c. More particularly, by depressing both the mode specification selection mode is established, and by then operating the keys in the following manner, operate key 11b→operate key 11b→operate key 11b→operate key 11b in this condition, the display specification in which the measuring unit for speed is indicated in "mph (mile/h)" and the measuring unit for distance is indication "miles", when No. 1 tires are used, can be selected. Similarly, by depressing the mode key 11a and the hour key 11e at the same time, and operating the keys in the following manner, operate key 11b→operate key 11b→operate key 11c→operate key 11b, the display specification is selected in which the speed unit is indicated in "km/h", the distance unit is indicated in "km", when the tire No. 1 is employed. Further, by operating the keys in the following manner, operate key 11c→operate key 11c→operate key 11c→operate key 11c while depressing the mode key 11a and the hour key 11e at the same time, the specification is selected in which the speed unit is indicated in "Km/h", the distance unit is indicated in "Km", and the tire size No. 2 is employed. Other appropriate settings can be made as required.

In the control panel 10, the control circuit 30 is mounted on the control printed circuit board 13 indicated in FIG. 2 by a dotted line.

Figure 3:
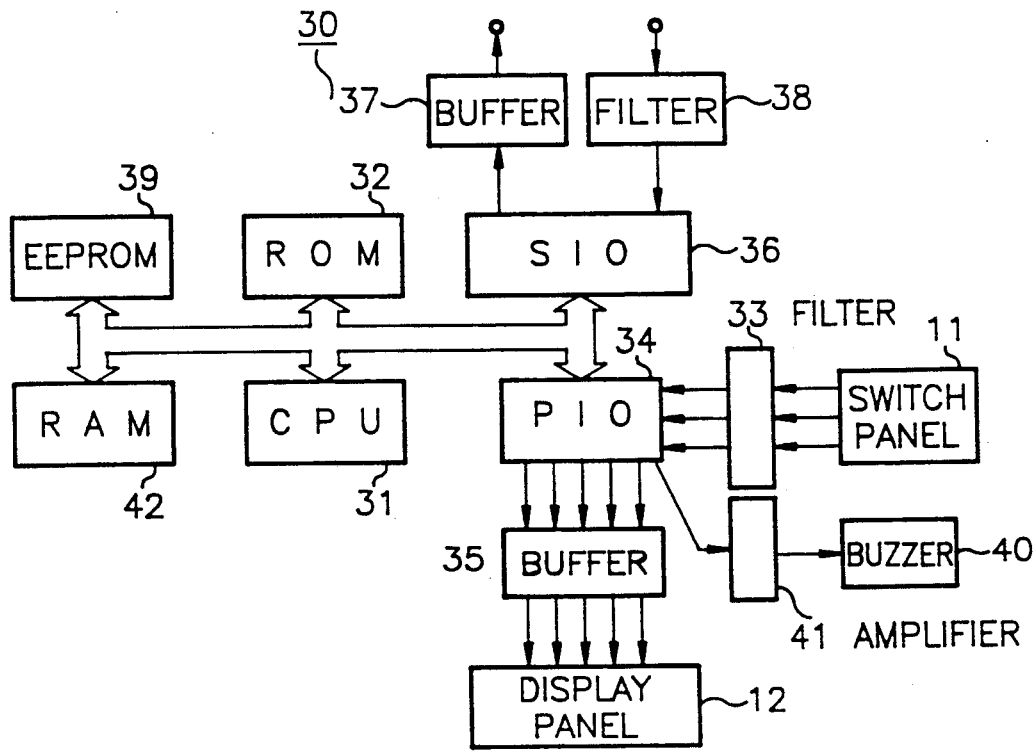
FIG. 3 is a block diagram of the control circuit 30 of the control panel 10.

FIG. 3 is a block diagram showing the arrangement of the control circuit 30 of the control panel 10.

In the drawing, the CPU 31 is a microprocessor unit which operates the control circuit 30 in accordance with a program stored in the ROM 32.

The respective ON/OFF signals of the mode key 11a, the data input keys 11b, 11c, the type key 11d, and the hour key 11e on the switch panel 11 are fed to a PIO 34 via a filter 33 for preventing chattering. The PIO 34 is a parallel input and output interface unit which sends an interruption request to the CPU 31 when any one of the above keys is made ON, and after permitting the interruption, the CPU 31 carries out an appropriate process in response to the key operated.

Also, the CPU 31 transmits the type ID and the mode ID corresponding to the setting mode selected by the operation of the type key 11d and the mode key 11a, and the setting value ID selected by the data input keys 11b, 11c to the PIO 34, and feeds the type ID, the mode ID, and the setting value ID to a buffer 35. The display panel 12 reads out the data stored in the buffer 35 at a predetermined cycle, to indicate the mode ID, the setting value ID, the type ID on the display segments 12a, 12b, and 12d respectively.

Figure 4:
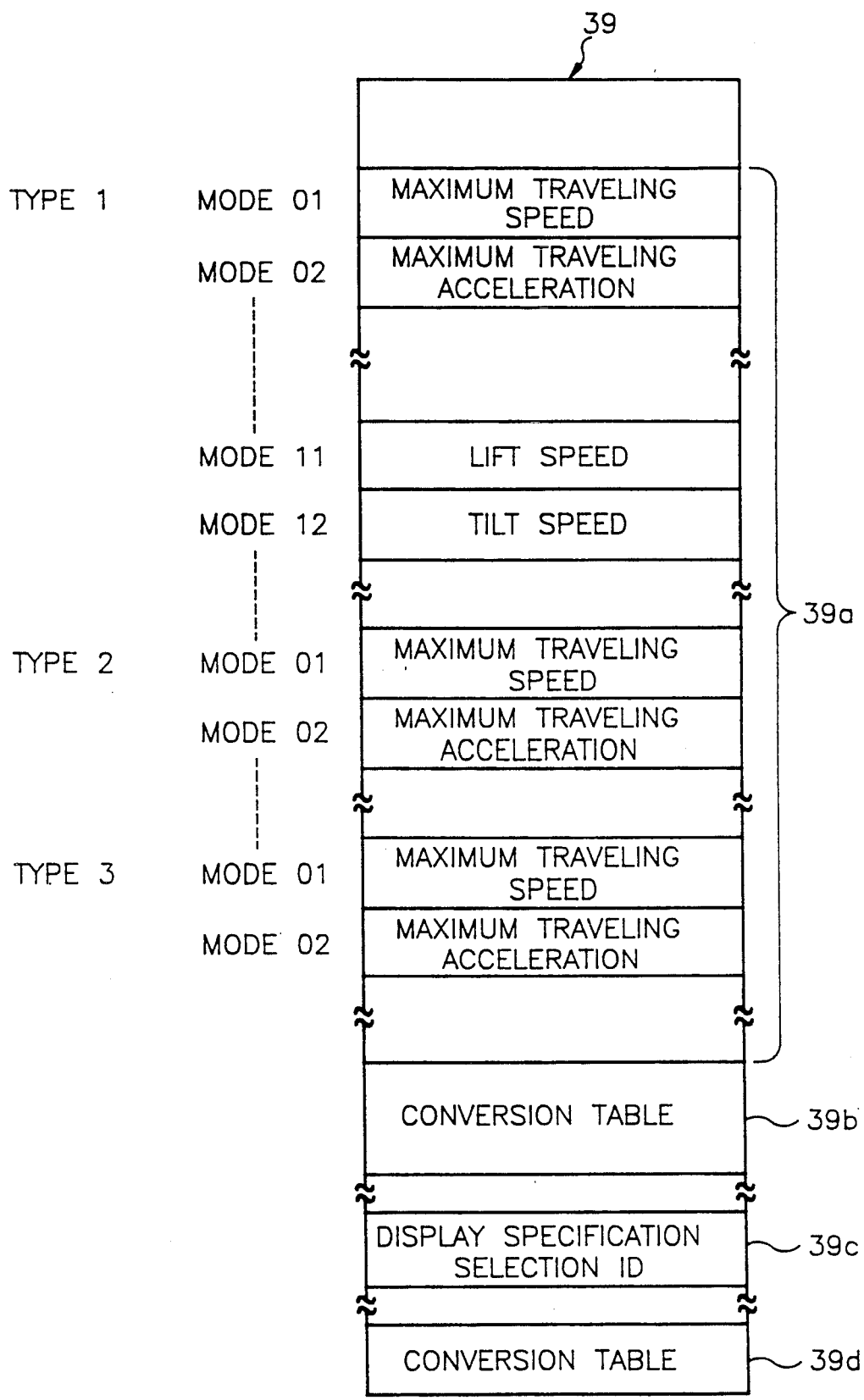
FIG. 4 illustrates the internal structure of the EEPROM 39.

Further, the CPU 31 transmits the setting values corresponding to the setting value ID set by an operator through the operation of the keys on the switch panel 11 to an SIO 36. The SIO 36 is a serial input and output interface unit for transmitting and receiving data to and from the travelling control circuit, explained later, and feeds the travelling control circuit with the type ID, the mode ID and the setting values in the form of two bytes of serial data via a buffer 37. The SIO 36 also receives the travelling speed data, the cumulative travelling distance data, the cumulative travelling hours, the cumulative ON hours of the key switch and the cumulative cargo handling hours from the travelling control circuit via a filter 38 and transmits this data to the CPU 31. The CPU 31 converts the travelling speed data and the cumulative travelling distance data in accordance with the required display specification, using the display specification selection ID stored in an EEPROM (Electrically Erasable Programmable ROM) 39 which functions as the control data storage means. The EEPROM 39 is a programmable ROM which stores the most recent setting value ID established by the operator's key operation on the switch panel 11 and the CPU 31 feeds the setting value ID of the respective mode established by the operation of the key of the switch panel 11 to the EEPROM 39. The internal structure of the EEPROM 39 is shown in FIG. 4. The EEPROM 39 comprises a setting value ID storage area 39 which stores the setting value ID of the each mode for each type ID, a conversion table 39b for converting the setting value ID of respective modes to an actual setting value such as a speed value and acceleration value, a display specification selection ID storage area 39c for storing the indicated travelling distance and the travelling speed, and a conversion data storage area 39d for converting data according to the specified display specification. In the setting value ID storage area 39a, the setting values ID for each mode and each type are stored as type 1 (mode 01, mode 02, . . . , mode 21 . . . ) and type 2 (mode 01 . . .), . . .

The buzzer 40 informs the operator whether the setting value of each mode established by the operator's key operation of the switch panel 11 is registered correctly. The CPU 31 outputs a signal indicating the completion of the setting process to the buzzer 40 via an amplifier 41 for signal amplification, when the mode ID and setting value ID sent to the travelling control circuit by the CPU 31 via the SIO 36 and the buffer 37 are correctly transmitted to the travelling control circuit, and informs the operator of the completion of the setting process by activating the buzzer 40 for, e.g., one second.

The travelling control circuit sends the mode ID and the setting value transmitted from the CPU 31 back to the SIO 36, and if there is an error in the received data, the travelling control circuit sends the faulty data back to the SIO 36. The CPU 31 determines whether or not the transmission of the data is correct, based on the mode ID or the setting value sent back from the SIO 36, and if there is an error in the data transmission, outputs an error signal to the buzzer 40 via the amplifier 41 to inform the operator of an error in the setting process by activating the buzzer 40 (for example, one second on, a half second off and one second on).

A RAM 42 provides a working area for the CPU 31 required for the execution of various jobs.

Figure 5:
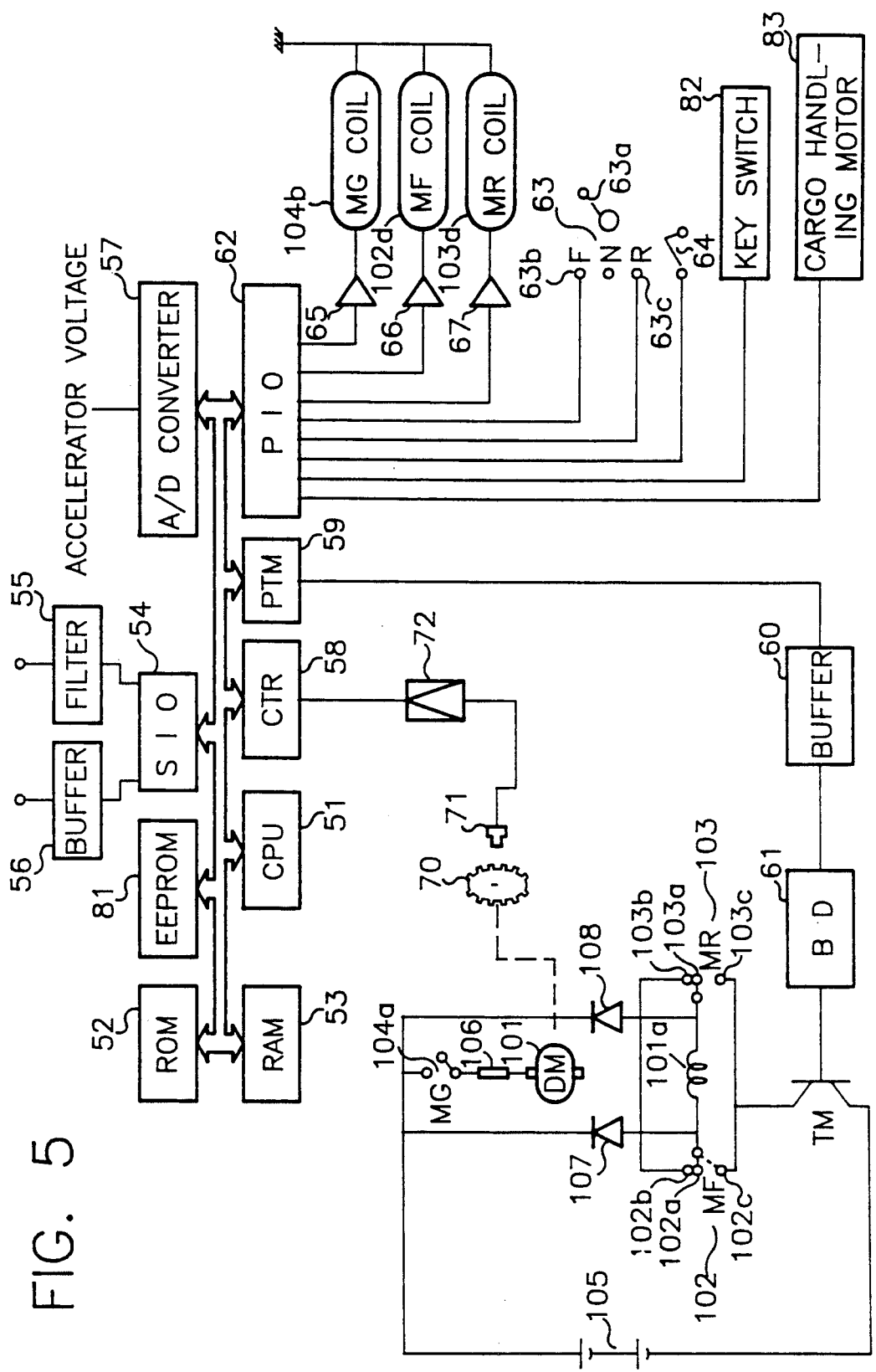
FIG. 5 is a block diagram of a travelling control circuit.

Turning to FIG. 5, the circuit arrangement of the travelling control circuit is illustrated in the form of a block diagram. In the diagram, a CPU 51 is a microprocessor unit which controls the travelling control circuit in accordance with a program stored in a ROM 52. A RAM 53 stores the setting value of the mode received from the control circuit 30 of the control panel, and further, provides a working area for the CPU 51 required for the execution of various jobs. The EEPROM 81 is a non-volatile memory which stores the cumulative travelling distance data, the cumulative ON hours of the key switch, the cumulative hours of travelling, and the cumulative hours of cargo handling described before (hereinafter, these data are generally called maintenance hours data).

The CPU 51 transmits and receives data to and from the control circuit 30 of the control panel 10 through the SIO 54. The SIO 54, which is a serial input and output interface unit similar to the SIO 36, receives the mode ID and setting value transmitted from the control circuit 30 via a noise removing filter 55 and transmits the speed data received from the CPU 51 to the control circuit 30 via a buffer 56. An A/D converter 57 converts analogue data in the form of an accelerator voltage, which corresponds to the operation angle of an accelerator pedal of the vehicle and which is fed by an accelerator voltage detecting circuit (not shown), to digital data and transmits the data to the CPU 51. A CTR 58 counts the number of pulses, and receives pulses which are generated by the vehicle speed sensor 71 disposed in the vicinity of the differential ring gear 70 when contact between the tips of the teeth of the gear 70 is detected by the sensor 71, via an amplification and shaping circuit 72 for waveform shaping, and transmits the counted pulse numbers to the CPU 51. The CPU 51 detects the rotating speed of the ring gear using the number of pulses counted by the CTR 58 within a predetermined period, and the number of teeth of the ring gear, and then the CPU 51 calculates the speed data (travelling speed) and travelling distance data from the rotation of the ring gear. A PTM (Programmable Timer) 59 is a wave generating circuit which generates a rectangular pulse wave in accordance with the duty factor given by CPU 51. The generated pulse wave is fed to a base driving circuit 61 via a buffer 60. The base driving circuit 61 controls the ON/OFF action of the base current of a main transistor TM according to the rectangular pulse wave received through the buffer 61. This ON/OFF action of the base current of the main transistor TM allows a chopper control of the travelling motor 101. A direction switch 63 is provided for generating and transmitting a forward direction signal or a reverse direction signal to the PIO 62 when the forward travelling direction or the reverse travelling direction is specified by a direction lever, not shown in the drawing. Also, an accelerator switch 64, which becomes on condition when the accelerator pedal (not shown) is operated, generates an accelerator signal indicating the position of the acceleration pedal and transmits the signal to the PIO 62.

The PIO 62, which is an parallel input and output interface unit, stores the acceleration ON/OFF signal input from the accelerator switch 64 and a forward or a reverse direction signal input from the direction switch 64.

The CPU 51 reads out the travelling direction data indicated by direction switch 63 and on/off state of accelerator switch 64 from the PIO 62 and controls the travelling direction and speed of the vehicle using this data. Also the PIO 62, based on the command of the CPU 51 and through buffers 65, 66 and 67, controls the ON/OFF state of currents flowing through a solenoid coil 102d of a forward direction travelling contactor MF, a solenoid coil 103d of a reverse direction travelling contactor MR, and a solenoid coil 104b of a regenerating contactor MG respectively.

The MF and MR contactors switch between the forward direction travelling and reverse direction travelling, and a movable contact 102a of the main contact in the forward direction travelling contactor MF is in contact with a fixed contact 102b when switched off, and with a fixed contact 102c when switched on. Similarly, a movable contact 103a of the main contact in the reverse direction travelling contactor MR is in contact with a fixed contact 103b when switched on and with a fixed contact 103c when switched off.

The regenerating contactor MG return the electric power, generated by the travelling motor 101 by regenerating the control of the motor 101 when switched between the forward and reverse directions, to a battery 105. A main contact 104a is disposed between a positive pole side of the battery 105 and a current sensor 106, and the other end of the current sensor 106 is connected to an armature coil of the travelling motor 101, not shown in the drawing. One end of a field coil 101a of the travelling motor is connected to an anode of a flywheel diode 107 and the other end thereof is connected to a flywheel diode 108, and cathodes of both flywheel diodes 107 and 108 are connected to the positive pole side of the battery 105.

Further, the one end of the field coil 101a connected to the anode of the flywheel diode 107 is connected to the movable contact 102a of the forward direction travelling contactor MF, and the other end of the field coil 101a connected to the anode of the flywheel diode 103 is connected to a movable contact 103a of the reverse direction travelling contactor MR. The collector of the main transistor TM, which control the flow of electric current into the travelling motor 101 by a chopper control is connected to the fixed contact 102c of the forward direction travelling contactor MF and the fixed contactor 103c of the reverse direction contactor 103, and the emitter of the main transistor TM is connected to the negative pole side of the battery 105.

Also a main key switch ON signal 82 and an on signal 83 of the cargo handling motor for, e.g., a lifting and tilting motion, and transmitted from a current switch (not shown) to the PIO 62 and transmitted from the PIO 62 to the CPU 51. The CPU 51 also detects the travelling motion of the forklift truck in accordance with the pulse signal from the CTR 58.

The CPU 51 is provided with a key switch ON timer, cargo handling hour timer and the travelling hour timer, built into the CPU 51. When the CPU 51 detects the ON operation of the key switch 82, the CPU 51 initiates the time measuring action of the key switch ON timer and transmits the measured time to the EEPROM 81 at predetermined intervals. Similarly, when detecting an ON action of the cargo handling motor ON switch 83, the CPU 51 starts the time measuring action of the cargo handling hour timer and transmits the measured time to the EEPROM 81. The CPU 51 also starts the time measuring action of the travelling hour timer upon a detection of a travelling of the forklift truck, by the pulse signal, and transmits the measured time to the EEPROM 81.

In addition, the CPU 51 counts the pulse signals from the CTR 58, calculates the travelled distance, and transmit the travelled distance to the EEPROM 81. The storage area of the EEPROM 81 is divided into the cumulative ON hour storage area, the cumulative cargo handling hour storage area, the cumulative travelling hour storage area, and the cumulative travelling distance storage area. The CPU 51, when transmitting the hour and distance data to EEPROM 81, adds these hours and distance to the corresponding data stored in the storage area, and stores the cumulative data in the EEPROM 81.

When the CPU 51 receives a command from the control circuit 30 of the control panel 10 via SIO 54 requesting the speed data, it reads out the maintenance hour data from the EEPROM 81 and transmits it together with the speed data calculated in aforementioned step to the control circuit 30 via the SIO 54 and the buffer 56.

Now the operation of the embodiment constructed as described above will be explained.

FIGS. 6(a)-(f) show the method of operating the keys of the switch panel 11 for establishing the setting value ID of the maximum travelling acceleration, which is in the mode ID "2" under the type ID "2".

As shown in FIG. 6(a), when the mode key 11a of the switch panel 11 is operated, the function mode of the display panel 12 is switched from the normal indication mode to the setting mode, and the mode ID "01", and thus the maximum travelling speed setting mode is indicated at the display segment 12a.

Then, as shown in FIG. 6(b), by operating the type key 11d, the type ID "1" indicated at the display segment 12d of the display panel is changed to "2" and the setting value ID "4", which is the present setting under the type ID "2" and the mode ID "01" (the maximum travelling speed), is indicated at the display segment 12b.

As shown in FIG. 6(c), by operating the mode key 11a again, the maximum travelling acceleration setting mode is selected, and the type ID "2" is indicated at the display segment 12d, the mode ID "02" which represents the maximum travelling acceleration setting mode is indicated at the segment 12a, and the setting value ID "3" of the setting currently established in the maximum travelling acceleration setting mode is indicated at the display segment 12b.

Namely, by the first operation of the mode key 11a, the normal indicating mode is switched to the setting mode and the mode ID "01" is selected, then by the operation of the type key 11d and mode key 11a, the mode ID "02", which is the maximum travelling acceleration setting mode under the same type ID "2", is selected and the setting value ID "3", which is already established for the maximum travelling acceleration mode, is indicated at the display segment 12b. In this manner, the respective setting value ID for each type and each mode can be indicated at the display segment 12b by operating the type key and mode key. The operations of FIG. 6(b) and FIG. 6(c) can be made in the reverse order, and desired setting value can be indicated at the segment 12b by operating the type key 11d and the mode key 11a.

Next, as shown in FIG. 6(d), by operating the data input key 11b, the setting value ID "4" for the maximum travelling acceleration is indicated at the segment 12b and by operating the data input key 11b again, the setting value ID "5" is indicated at the display segment 12b.

After setting the setting value ID "5" in the maximum travelling acceleration mode by the key operation explained above, if the keys are not operated for a predetermined period (e.g., more than three seconds) a sound warning for one second is output by the buzzer 40, as shown in FIG. 6, to inform the operator that the setting value ID "5" is established as the setting for the maximum travelling acceleration.

Although the above explanation concerns the method of setting the maximum travelling acceleration, on the setting of other travelling powers such as the maximum travelling speed or the cargo handling power such as the lifting and tilting speed, can be carried out by a similar operation of the key of the switch panel 11.

Figure 7B:
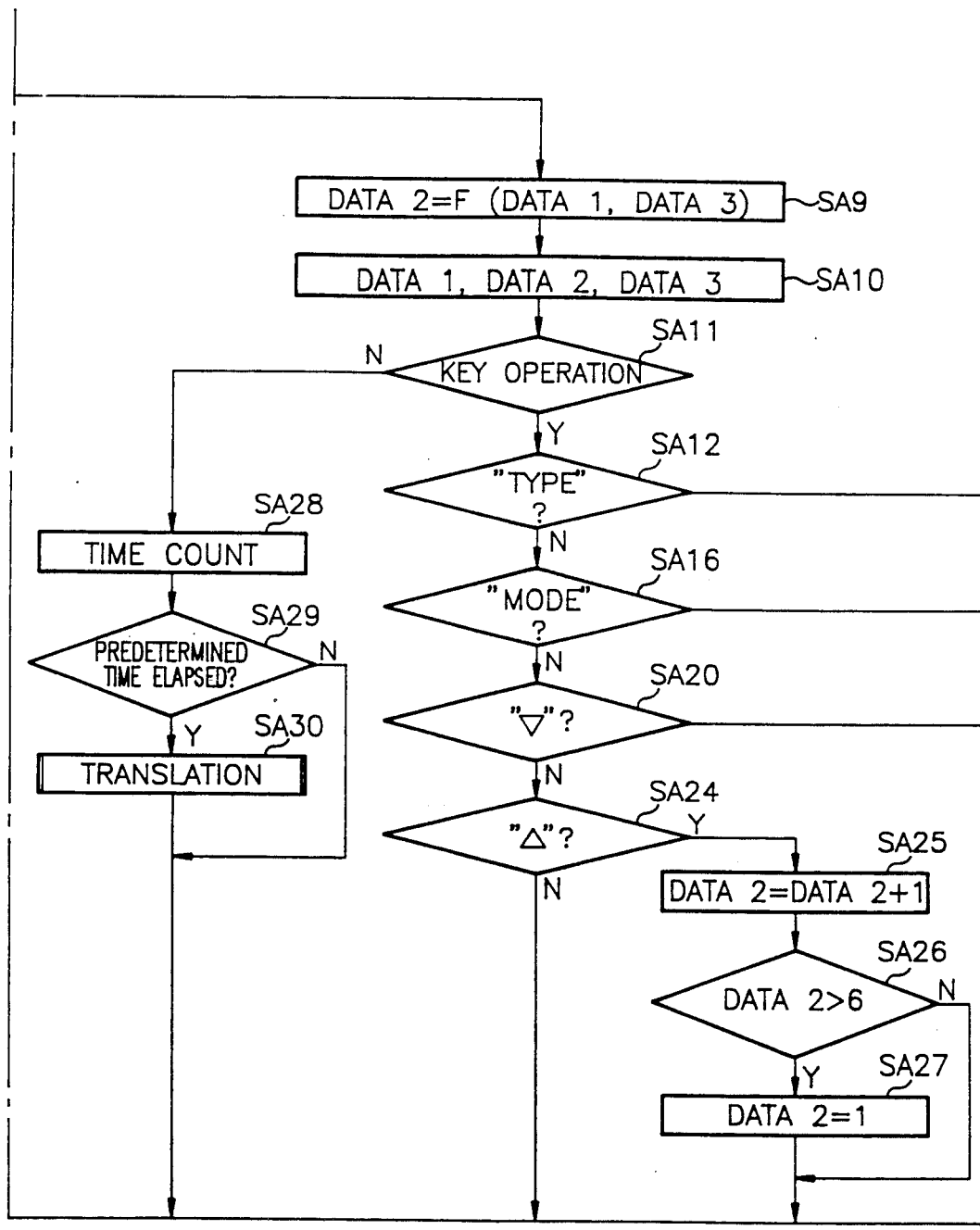
FIG. 7 consisting of FIGS. 7a, 7b and 6c, is a flow diagram showing the processing steps when the keys of the control panel 10 are operated.
Figure 7C:
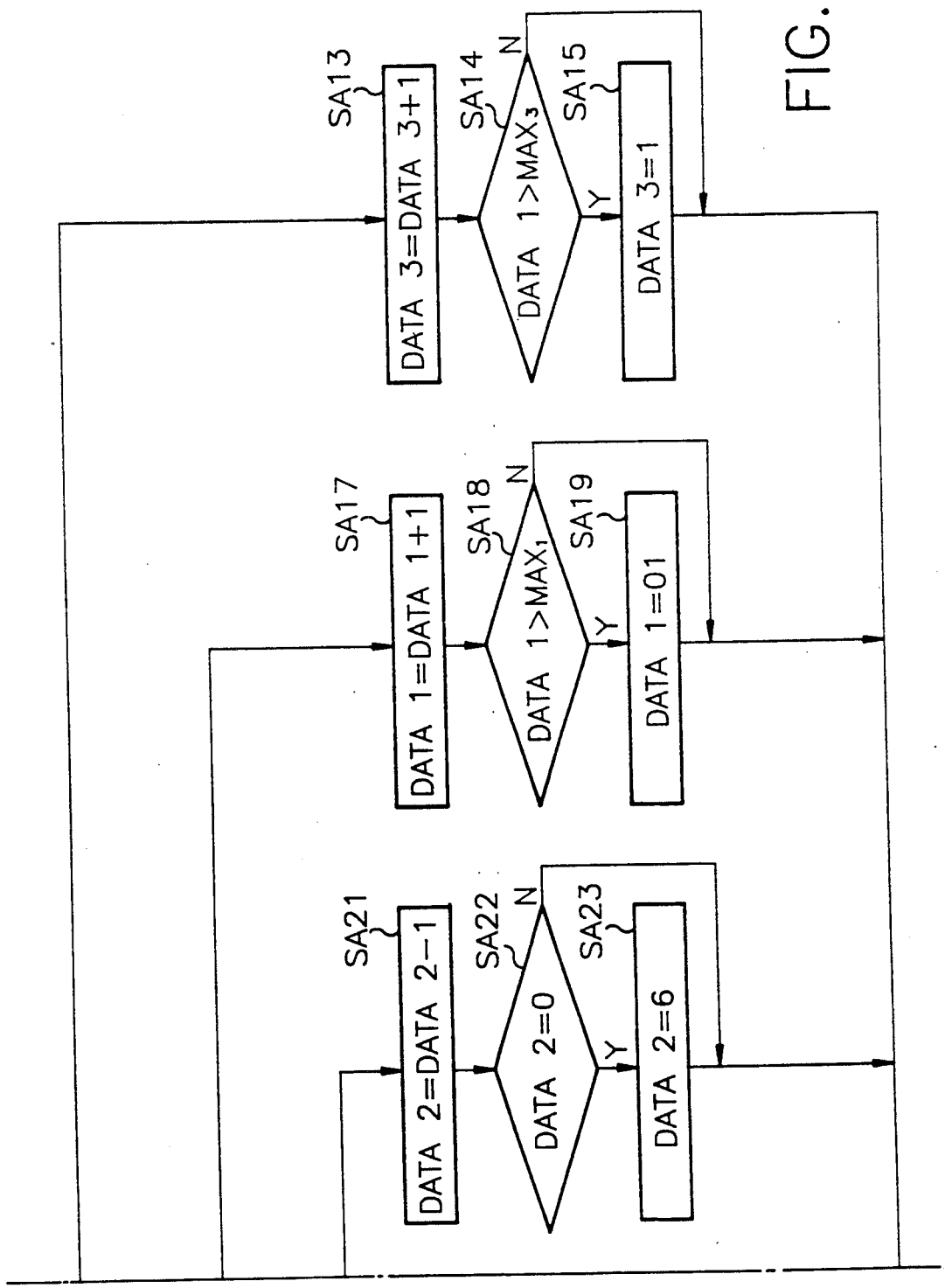

Now, the process flow of the control circuit 30 under the control of the CPU 31 when the keys of the switch panel 10 are operated is explained with reference to the flow chart in FIG. 7, wherein data 1, data 2, data 3, and data 4 in the flow chart represent data stored in the working area of the RAM 42 as the type ID, the mode ID, the setting value ID, and the maintenance hours indication ID explained later, respectively, which are established by the operation of the keys on the switch panel 11.

First, when the key switch is turned on and electric power is supplied, the system as a whole is started and the CPU 31 initializes the system by clearing data in the RAM 42, setting the mode of the input/output of the PIO 34 and carrying out an interruption, initially setting the SIO 36, for example, the communication mode of each channel of the SIO 36 and carrying out an interruption, and displaying an initial condition at the display panel 12 (Step SA1).

Then, the CPU 31 outputs a command requesting a speed data input to the travelling control circuit via the SIO 36 and the buffer 37 and receives the speed data and the maintenance hours data from the travelling control circuit via the filter 38 and the SIO 36. The CPU 51 outputs the calculated speed data and the maintenance hour data read from the EEPROM 81 to the SIO 36 of the control circuit 30 via the SIO 54 and the buffer 56, after receiving the command from the CPU 31 (Step SA2).

Then the CPU 31 reads out the indication mode stored in the RAM 42 (Step SA3), and if the indication mode is the normal mode, the CPU 31 reads the display specification selection ID stored in the EEPROM 39 and converts the speed and the cumulative travelling distance to meet the display specification using the conversion data stored in the EEPROM 39 (Step SA35). Next, the CPU 31 reads the maintenance hours indication ID stored in the RAM 42, selects the maintenance hours to be indicated, and indicates same together with the speed data at the display segments 12e and 12a of the display panel 12. At the same time, the measuring unit and indication mark are displayed in accordance with the display specification (Step SA4). Where, at the display segment 12d, the type ID is always indicated regardless of the indication mode.

Then the CPU 31 determines, through the PIO 34, whether the keys of the switch panel 11 are operated (Step SA5), and whether the keys are operated in the pattern representing the display specification selection pattern (the mode key 11a and the hour key 11e are pressed simultaneously) (Step SA40). If the keys are operated in that pattern, the setting of the display specification ID stored in said EEPROM 39 is changed in accordance with the operating pattern of the data input key 11b, 11c as described before (Step SA45). If the display specification selection mode pattern is not presented in the step SA40, the CPU 31 determines whether the hour key 11e has been operated (Step SA60), and if operated, adds 1 to the data 4 representing the maintenance hours indication ID (Step SA61), determines whether the data 4 exceeds the maximum value MAX4, of the maintenance hours indication ID (Step SA62), and if so, reinstates the value of the maintenance hours indication ID to 01 (Step SA63), then stores the altered maintenance hours indication ID in the RAM 42 as the data 4, and returns to step SA2.

As explained above, when the control panel 10 is in the normal indication mode, the maintenance hours ID can be changed from 1 to 4 cyclically in accordance with the steps SA61-63 by operating the hour key 11e, and corresponding to the maintenance hour ID, the respective maintenance hours data can be indicated on the display segment 12e. (For example, the cumulative travelling distance for maintenance hours indication ID=1, the cumulative ON hours of the key switch for the ID =2, ... ).

Then, if there is no operation of the hour key 11e in step SA60, the CPU determines whether the key operation is for the type key (Step SA50), and if so, adds 1 to the data 3 which represents the type ID (Step SA51) determines whether the value of the type ID exceeds the maximum value MAX3 of the type ID (Step SA52), and if so, returns the value of the data 3 to 01 (Step SA53), and sends the data 3 which represents the altered type ID to the SIO 54 via the SIO 36 (Step SA54). As described in detail later, the travelling control circuit is controlled by this type ID. If the value of the type ID does not exceed MAX3, the data 3 is sent as is in step SA54, and the process returns to step SA2. With the steps SA50-54, the setting of the type ID can be changed freely even in the normal indication mode of the control panel. If the type key is not operated in step SA50, the CPU 31 determines whether the mode key 11a has been operated (Step SA6) and if the mode key 11a has been operated, the CPU 31 registers in the RAM 42 that the indication mode of the control panel is the setting mode (Step SA7), then sets the value of the data 1 to 01 (Step SA8), and returns to step SA2.

If keys other than the above keys are operated in Step SA5 and SA6, or if there is no key operation, the process again returns to SA2.

Therefore, if the mode key 11a of the switch panel 11 is not operated in the normal indication mode, the mode of the control panel is fixed in the normal indication mode, steps SA1 to SA5 are repeated, and the present vehicle speed is indicated at the display segment 12a. Also, the type ID can be quickly set to an appropriate value in accordance with the skill of the operator or the working conditions in the normal indication mode of the control panel by operation of the type key 12d.

On the other hand, when the mode key 11a is operated in the normal indication mode, the CPU 31 judges that the indication mode of the control panel is the setting mode in the step SA3 and reads from the setting value ID storage area 39a of the EEPROM 39 the setting value ID which corresponds to the type ID represented by the data 3 and the mode ID represented by the data 1, and registers the setting value ID as the data 2 (Step SA9). Then, the CPU 31 transmits the above data to the display panel 12 via the PIO 34 and the buffer 35, and indicates the mode ID represented by the data 1 at the display segment 12a, the setting value ID represented by the data 2 at the display segment 12b, and the type ID represented by the data 3 at the display segment 12d respectively (Step SA10).

Then the CPU 31 detects an ON/OFF state of each key on the switch panel 11 through the filter 33 and the PIO 34 and determines whether the keys are operated (Step SA11), and if operated, determines whether the operated key is the type key 11d (Step SA12), and if the type key 11d is operated, adds 1 to the value of the data 3 (Step SA13) and determines whether the value of the data 3 after the addition is larger than the MAX3, which is the maximum value of the type ID (Step SA14), then if larger than the MAX3 returns to step SA2 after registering the value 1 as the data 3 (Step SA15). In this way, the type ID established by the operation of the type key 11d can be confirmed on the display panel 12 because in the setting mode of the display panel, the value of the type ID is changed from 1 to MAX3 cyclically by the steps SA13 to SA15 each time the type key 11d is operated, and the value of the type ID is indicated at the display segment 12d by step SA10.

Similarly, if the type key 11d is not operated in step SA14 above, the CPU 31 determines whether the mode key 11a is operated (step SA16) and adds 1 to the value of the data 1 if the mode key 11a is operated (step SA17), then determines whether the value of the data 1 is larger than MAX1, which is the maximum value of the mode ID (Step SA18), and if larger registers 01 to the data 1 (Step SA19) and again returns to step SA2.

Conversely, if the type key 11d and the mode key 11a are not operated, the CPU 31 determines whether the data input key 11c is operated (Step SA20) and if that data key is operated, subtracts 1 from the value of the data 2 (Step SA21), then determines whether the value of the data 2 is equal to zero (Step SA22). If the value of the data 2 is equal to zero, then the process returns to step SA2 after setting the value 6 to the data 2 (Step SA2).

Also, if the data input key 11c is not operated in step SA20, the CPU 31 determines whether the data input key 11b is operated (Step SA24), and if the data input key 11b is operated, adds 1 to the value of the data 2 (Step SA25), then determines whether the value of the data 2 is larger than 6 (Step SA26), and if the value of the data 2 is larger than 6, then the process returns to step 2 after setting the value 1 to the data 2 (Step SA27).

As explained above, in the setting mode of the display panel, the value of the data 2 is changed from 1 to 6 cyclically by steps SA21 to SA23 each time the data input key 11b is operated, and from 6 to 1 cyclically by steps SA25 to SA27 each time the data input key 11c is operated. The value of the data 2 is indicated at the display segment 12b by step SA10 in the above process, and thus the operator can confirm the setting for the setting values of the type ID and the mode ID, at the display panel 12.

If it is determined in the step SA11 that there is no key operation, the CPU 31 starts to count the time by a time counter, and if there is no key operation for a predetermined period (for example, 9 seconds), the CPU 31 reads out the setting values corresponding to the type ID set by the step SA13, the mode ID set by the step SA17, and the setting value ID set by the step SA21 or SA25, using the conversion table 39b, via the SIO 36 and the buffer 37, and then executes the transmitting process to send the data to the travelling control circuit via the SIO 36 and the buffer 37 (Steps SA11, SA28-SA30).

Figure 8:
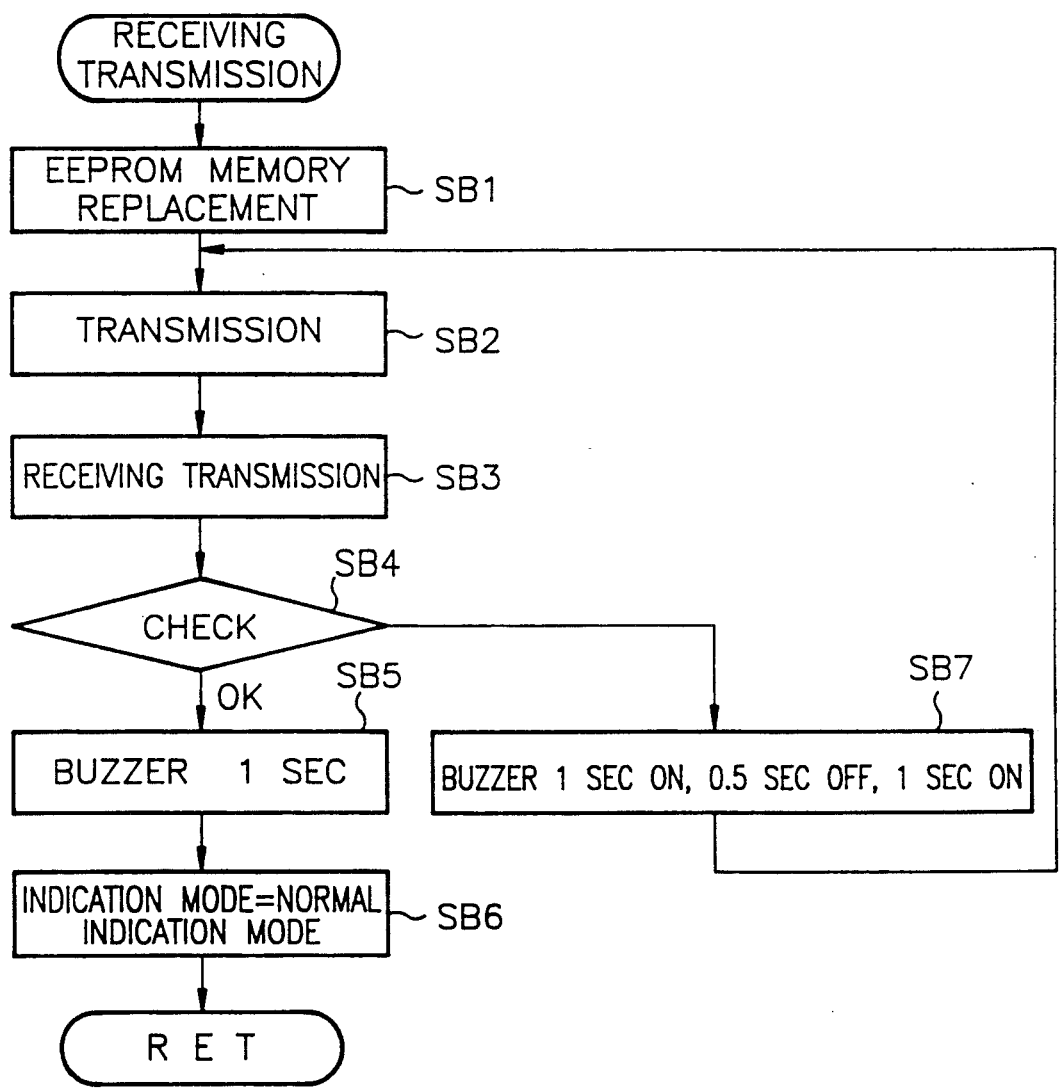
FIG. 8 is a flow diagram illustrating the steps of the transmission process of the control panel 10.

FIG. 8 is a flow diagram showing the transmitting process in the step SA30. Based on the data 1, data 2, and data 3, the CPU 31 locates the setting value ID in the EEPROM 39 which corresponds to the mode ID and the type ID represented by the data 1 and the data 2 respectively, and replaces said setting value ID by a new setting value ID represented by the data 2 (Step SR1), reads out the new setting value, which corresponds to the mode ID, the setting value ID and the type ID represented by the data 1, the data 2 and the data 3 respectively, with reference to the conversion table 39b of the EEPROM 39, and transmits the mode ID, the type ID, and the new setting value to the travelling control circuit via SIO 36, and the buffer 37 (Step SB2), receives the same mode ID, type ID and setting values, transmitted to the travelling control circuit in step SB2, from said travelling control circuit via the filter 38 at SIO 36 (Step SB3), reads out the status data from the SIO 54 of the travelling control circuit via SIO 36 to check whether the correct data has been received by the travelling control circuit, and determines whether a transmission error such as a parity error has occurred during the transmission (Step SB4).

Then, if it is determined that the mode ID and the setting value ID have been transmitted to the travelling control circuit correctly, the CPU 31 activates the buzzer 40 for one second via the PIO 34 and the amplifier 41, to inform the operator that the setting is completed (Step SB5). Then the CPU 31 switches the indication mode of the display panel to the normal indication mode and informs to the RAM 41 that the indication mode is the normal indication mode (section SB6). Conversely, if it is determined that a transmission error has occurred in the step SB4, the CPU 31 activates the buzzer via PIO 34 and the amplifier 41 to warn of the error. At this time, for example, the buzzer 40 sounds twice for one second at an interval of a half second. As explained above, the setting value ID of the mode specified by the operator using the key of the switch panel 11 is stored in the EEPROM 39, and the setting value corresponding to the setting value ID is transmitted to the travelling control circuit via the SIO 36, the buffer 37.

If it is determined that a transmission error has occurred in step SB4, the above process is repeated until the mode ID and the setting value are transmitted correctly.

Now, the function of the travelling control circuit will be explained.

Figure 9:
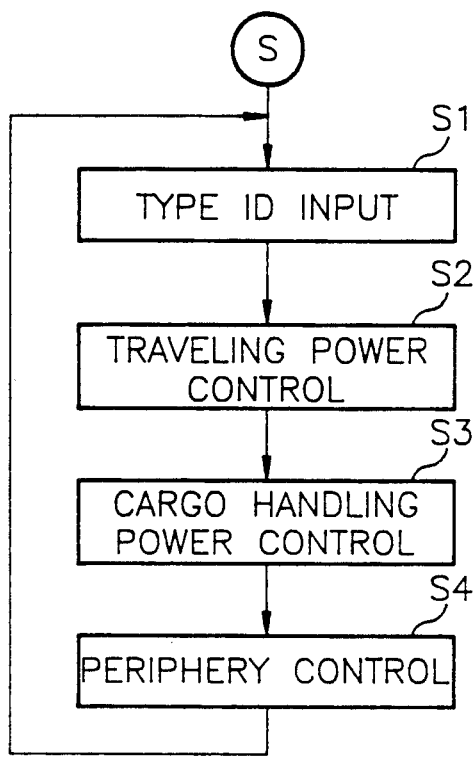
FIG. 9 is a general flow diagram showing the processing steps of the travelling and cargo handling control circuit as a whole.

FIG. 9 is a flow diagram showing the process flow of the travelling control circuit as a whole, which process is executed under the control of the CPU 51.

In the diagram, step S1 represents the process in which the type ID is transmitted at the power-on of the system or when the data 3, which represents the type ID, is changed in the normal indication mode of the control panel 10 by steps SA51-54, and the process described below is controlled in accordance with the type ID. Next, step S2 is the process for controlling the travelling power such as the travelling acceleration and the travelling speed, in which the CPU 51 controls the travelling power by changing the duty factor of the main transistor TM for chopper control of the travelling motor in accordance with the setting value corresponding to the type ID transmitted in step S1, which is stored in the RAM 53 together with other setting values for the travelling power established by operation of the keys on the switch panel 11 of the control panel 10 by the operator.

Similarly, step S3 is the process for controlling the cargo handling power such as the lift speed and tilt speed of the fork by chopper control of the cargo handling motor in accordance with the setting value corresponding to the type ID transmitted in step S1, which is stored in the RAM 53 together with other setting values for the cargo handling power control established by the operation of the keys on the switch panel 11 of the control panel 10 by the operator.

Figure 10:
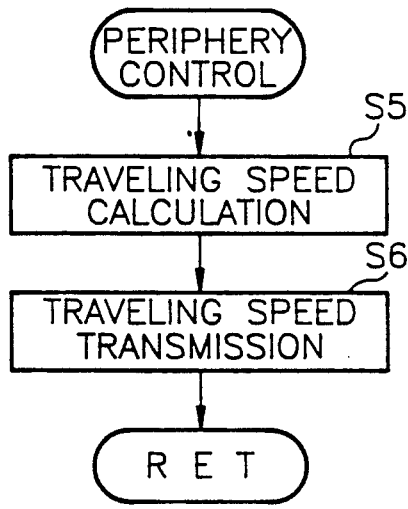
FIG. 10 is a flow diagram of the peripheral control process of the travelling control circuit.

At step S4, as indicated by the flow diagram in FIG. 10, the travelling speed is calculated (step S5), and this calculated speed transmitted to the control circuit 30 of the control panel 10 (Step S6).

While repeating steps S1-S4, the CPU 51 controls the travelling power according to the states of the direction switch 63 and the accelerator switch, read from the PIO 62, the cargo handling power according to the ON/OFF states of a tilt switch and a lift switch, which are switched ON and OFF by a tilt lever and a lift lever respectively.

Now the interruption accompanied by the replacement of the data in the RA53 will be explained.

Figure 11:
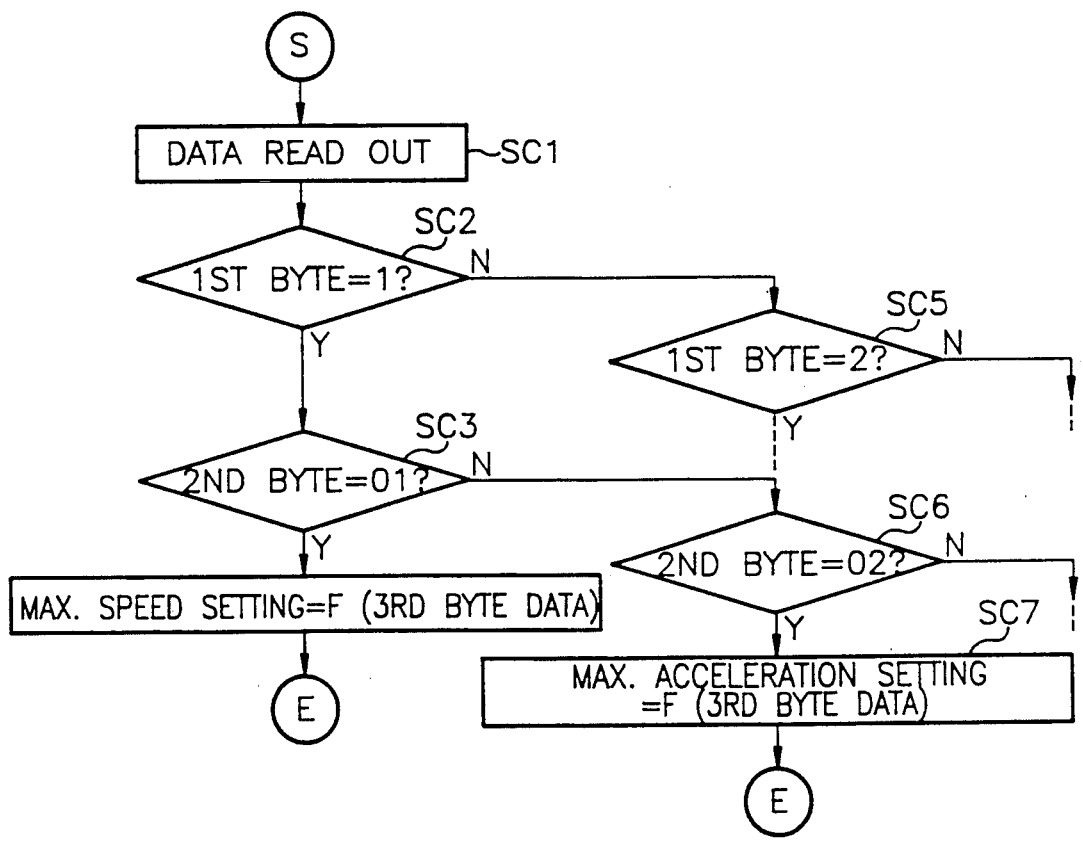
FIG. 11 is a flow diagram of the process of changing the setting of the travelling control circuit.
Figure 12:
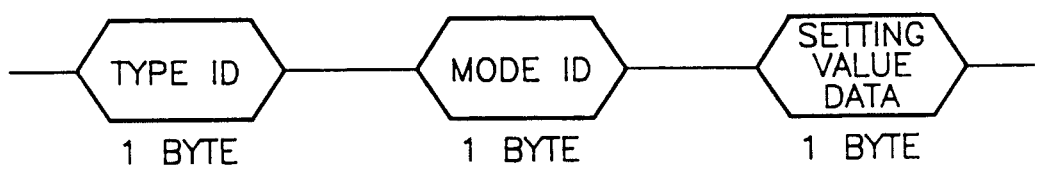
FIG. 12 shows the format of the data transmitted from the control circuit 30 of the control panel 10 to the travelling control circuit.
Figure 14A:
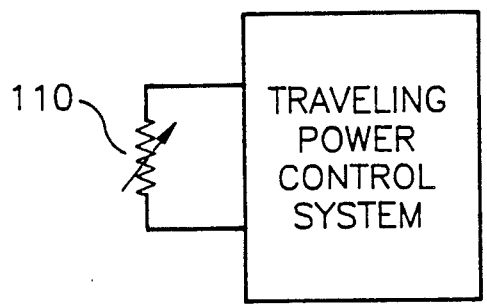
Figure 14B:
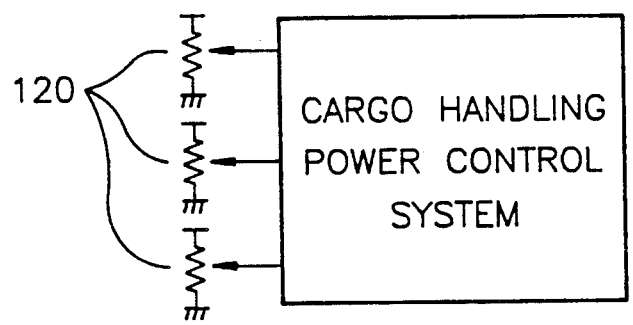

The data transmitted from the control panel in step SB2 is received by the SIO 54 via the filter 55 of the travelling control circuit. Upon receipt of the mode ID and the setting value from the control panel 10, the SIO 54 sends an interruption request to the CPU 51, which acknowledges the interruption request, permits the interruption, and reads the type ID, the mode ID and the setting value transmitted from the control circuit 30 of the control panel 10 from the SIO 54, then replaces the setting value stored in the RAM 53, which corresponds the type ID and mode ID with the setting value read from the SIO 54. The details of the above process are shown in the flow diagram of FIG. 11. Where the format of the data transmitted from the control circuit 30 of the control panel 10 to the SIO 54 is arranged so that the type ID is transmitted by the first one byte, and the mode ID by the second one byte, then the setting value is transmitted by the next one byte, as shown in FIG. 12.

The CPU 51 reads the type ID, the mode ID, and the setting value from the SIO 54, after permitting the interruption by the SIO 54 (Step SC1), then determines whether the data on the first byte (the type ID) is "1" (Step SC2), if the first byte data is "1", then it further determines whether the second byte data (the mode ID) is "01" (Step SC3), and replaces the maximum travelling speed setting data stored in the RAM 53, which corresponds to the mode ID "01", with the data transmitted by the third byte (Step SC4).

If the second byte data in the step SC3 is not "01", the CPU 51 then determines whether the second byte data is "02" (Step SC6), and if "02", replaces the maximum travelling acceleration setting data stored in the RAM 53, which corresponds to the mode ID "02", with the data transmitted by the third byte (Step SC7). If the first byte data is not "1", the CPU 51 determines whether the data is "2" (Step SC5), then in the same manner as above, determines which of the values "2"-"MAX3" is equal to the first byte data, determines which of the values "02"-"MAX1" is equal to the second byte data, then replaces the setting data according to the type ID indicated by the first byte data and the mode ID indicated by the second byte data.

As described above, the setting value for each "type" and each "mode" established by the key operation on the switch panel 11 of the control panel 10 is transmitted from the control circuit 30 of the control panel 10 to the travelling control circuit and stored in the RAM 53 by the interruption.

The control of the travelling and cargo handling by the CPU 51 based on the setting values for the travelling and cargo handling power stored in the RAM 53 will be explained with reference to the flow diagram in FIG. 13.

In the travelling control, the CPU 51 reads the state of the direction switch 63 from the PIO 62 and determines which direction is specified (Step SD1), and if forward direction is specified, closes the forward direction travelling contactor MF by energizing the MF coil by the PIO 62 and the amplifier 66 (Step SD2) to bring the movable contact 102a of the forward direction travelling contactor MF in contact with the fixed contact 102c, and then the travelling motor 101 starts to turn in the forward direction. Then the CPU 51 reads the ON/OFF state of the accelerator switch 64 from the PIO 62 and determined whether the accelerator switch 64 is on (Step SD3). If the accelerator switch 64 is ON, it then reads the accelerator voltage from the A/D converter 57 (Step SD4), computes the duty factor of the main transistor TM in accordance with the accelerator voltage, and sets the PTM 59 to the calculated duty factor. The PTM 59 generates a pulse signal according to the duty factor setting and transmits the signal to the base drive circuit 61 via the buffer 60. The base drive circuit 61 controls the main transistor TM in the chopper mode in response to the duty of the pulse signal received, and by this control, the travelling speed is controlled according to the accelerator pedal operation (step SD5). Then the CPU 51 read the counted number of the tips of the differential ring gear 70 which pass across the sensor 71 within a predetermined time, from the counter 58 (Step SD6), and calculates the vehicle speed (the travelling speed) from the counted number (Step SD7). Then the CPU 51 reads the setting value of the maximum travelling speed from the RAM 53 and calculates a value A using the formula: (Present travelling speeds—the maximum travelling speed setting) ×K (Step SD8). Where, K is an arbitrary constant for converting the travelling speed to the duty factor of the main transistor TM, and A represents an excessive duty factor which causes the present travelling speed to exceed the maximum travelling speed setting.

Then the CPU 51 determines whether the value of A is positive (step SD9), and if positive, calculates the duty factor of the main transistor TM to achieve the maximum travelling speed by subtracting the value A from the duty factor obtained by step 5, since the present travelling speed exceeds the specified maximum travelling speed (Step SD10). Then the CPU 51 sets the PTM 59 to the duty factor (Step SD11), the PTM 59 generates a pulse signal according to the duty factor setting, and transmits the signal to the base drive circuit 61 via the buffer 60. The base drive circuit 61 controls the ON/OFF of the base current of the main transistor TM in accordance with the transmitted pulse signal so that the actual duty factor of the main transistor TM becomes equal to the duty factor calculated from step SD10, and as a result, the travelling speed becomes equal to the maximum travelling speed setting.

As explained above, the travelling control is performed by adjusting the duty factor to reduce the travelling speed to the maximum travelling speed setting when the travelling speed exceeds the maximum travelling speed setting, with the duty factor obtained from the accelerator voltage, since the accelerator pedal is depressed too far.

Since the travelling speed is controlled, as explained, by detecting the actual travelling speed, checking whether the detected speed exceeds the maximum travelling speed setting, adjusting the duty factor of the main transistor TM, the vehicle speed does not exceeds the maximum travelling speed setting.

If the accelerator switch is OFF in step SD3, the CPU 51 sets the duty factor "0" to the PTM 59 and switches off the main transistor through the buffer 60 and the base drive circuit 61, and stops the chopper control of the travelling motor 101 (Step SD12).

Also, if the direction indicated by the direction switch 62 read from the PIO 62 is the reverse direction in step SD1, the CPU 51 closes the reverse direction travelling contactor MR by energizing the solenoid coil 103d of the reverse direction travelling contactor MR via the PIO 72 and the amplifier 67 (Step SD13). As a result, the movable contact 103a of the reverse direction contactor MR is connected to the fixed contact 103c and the travelling motor 101 starts to turn in the reverse direction.

If the direction switch 63 is in the neutral position in step SD1, the CPU 51 opens both the forward and reverse direction travelling contactors MF and MR by de-energizing the solenoid coils 102d and 103d of the forward and reverse direction travelling contactors MF and MR through the PIO 62 and the amplifiers 66, 67, and stops the travelling motor 101 (Step SD14).

Although not shown in the drawing, the cargo handling control circuit can be constructed in a similar manner to that of the travelling control circuit, and the fork may be controlled by hydraulic pressure generated by the cargo handling motor controlled by a similar chopper control mode as used for the travelling motor, on the basis of the setting values of the lifting speed or tilting speed, etc. which are established by the operation of the keys on the control panel 10.

In this embodiment, the setting values established by the operator are maintained even when the key switch is switched off, since these setting values are stored in the EEPROM 39 in the control panel 10. Therefore, it is advantageous in that it is unnecessary to re-establish the setting values at each start up. Further, in this embodiment, the types of the setting values for the respective modes established in the setting mode of the display panel can be cyclically changed one after another by operating the type key, so that the control type can be quickly set in accordance with the skill of the operator and the working conditions. The maintenance hours data, such as the cumulative travelling distance, is also stored in the EEPROM 81, and thus accurate maintenance work data is obtained, as the data is maintained during an off state of the key switch.

Further, in this embodiment, the respective controls of the travelling and the cargo handling are performed smoothly even if the key operation of the control panel is carried out in the travelling or cargo handling motion since, in this embodiment, two CPUs are employed and the control for the control panel and the travelling, cargo handling circuit is shared by the respective CPU. The transmission of the data between the two CPUs is performed by serial transmission using the SIO, and this allows a high density mounting of the devices with less wiring.

In this embodiment, the memory device which stores the setting values is not limited to an EEPROM, and a RAM may be employed which may be adapted to maintain the memory by a battery back up. Also the data transmission between the two CPUs may be performed by a parallel transmission method, or a single CPU may control both the control panel and the travelling and cargo handling circuits.

As explained above, according to the present invention, the travelling power and the cargo handling power can be easily adjusted by a key operation of the control panel, and a suitable travelling or cargo handling operation in accordance with the environmental condition is obtained, whereby an improvement of the safety in the travelling and cargo handling operation and an efficient working is realized. Further, the travelling and cargo handling power can be changed easily and quickly by the selection means and the storage means according to the level of skill of the operator, the needs of the operator, or the working conditions.

Also a watertight construction can be easily achieved according to the invention, although this was difficult in the prior art, because the variable resistance, which is difficult to make watertight, was employed for the adjustment of the travelling power.

Further, according to the present invention, the maintenance hours data such as various cumulative operation hours and the cumulative travelling distance are indicated by changing the indication of a single indicator, and an appropriate maintenance can be achieved by obtaining accurate information on the operating condition of the vehicle.

Further, a different indication specification according to the country in which the vehicle is used can be selected by the keyboard, so that the setting of the indication specification can be advantageously carried out in a simple and reliable manner without the need to adjust the control circuit built into the vehicle body, as in the prior art.

We claim:

1. A battery powered vehicle equipped with a control and display system on the vehicle body comprising, a drive means and a battery means which supplies electricity to said drive means and said control and display system, said control and display system characterized in that it comprises, in combination;
    a control data input means for inputting a plurality of control data;
    a control data storage means for storing said plurality of control data input by said control data input means;
    operation detecting means for detecting a plurality of types of vehicle operation initiated by an operator;
    operating data collecting means for collecting a plurality of operating data in accordance with the operations detected by said operation detecting means;
    an operating data storage means for storing each of said operating data collected by said operating data collecting means;
    a selection means for selecting a portion of said plurality of control data stored in said control data storage means, and a portion of said plurality of operating data stored in said operating data storage means;
    a drive control means for controlling said drive means according to said control data selected by said selection means; and
    a display means for indicating said control data and said operating data selected by said selection means.

2. A battery powered vehicle equipped with the control and display system of claim 1, wherein
    said selection means and said control data storage means are installed in a control circuit which is composed of electronic devices,
    and said drive control means, said operating data collecting means and said operating data storage means are installed in a travelling control circuit which is composed of electronic devices,
    said control circuit and said travelling control circuit are communicatively interconnected by means of a data transmission and receiving circuit.

3. A battery powered vehicle equipped with the control and display system of claim 1 or claim 2, wherein said control data storage means and said operating data storage means comprises a non-volatile storage means.

4. A battery powered vehicle equipped with the control and display system of claim 3, wherein said plurality of control data input by said control data input means and stored in said control data storage means includes display specification selection data, said selection means selects a display specification data stored in said control data storage means according to said display specification selection data and converts said operating data to a numerical value for indication using said selected display specification data to meet the display specification specified by said display specification selection data, and indicates said numerical value on said display means.

5. A battery powered vehicle equipped with the control and display system of claim 1, wherein said data input means and said display means are mounted on an exposed position of said battery powered vehicle to thereby allow an operator to easily operate said means.

6. A battery powered vehicle equipped with the control and display system of claim 1, wherein said driving means comprises a travelling drive system for driving said battery powered vehicle and a cargo handling drive system for actuating a cargo handling means installed in said battery powered vehicle.

7. A battery powered vehicle equipped with the control and display system of claim 6, wherein said operation detecting means comprise a travelling detection means for detecting whether said travelling drive means of said battery powered vehicle is operating or stopped, and in addition at least one of;
    a key switch detecting means for detecting an ON action of a key switch connecting a main electric source, of said battery powered vehicle, and a cargo handling detecting means for detecting an operation of said cargo handling system.

8. A battery powered vehicle equipped with the control and display system of claim 7, wherein said operation detecting means comprise a travelling distance measuring means which measures the travelling distance of said battery powered vehicle according to the detection by said travelling detection means, and in addition, at least one of;

a travelling hour measuring means which measures the travelling operation time according to the detection by said travelling detecting means, and;

an ON hour measuring means which measures the ON time of said key switch according to the detection of said key switch detecting means, and;

a cargo handling hour measuring means which measures the time for cargo handling operation according to the detection of said cargo handling detecting means.

9. A battery powered vehicle equipped with the control and display system of claim 8, characterized in that a cumulative travelling distance, which is an accumulation of said travelling distance, is stored in said operating data storage means, and in addition, at least one of;

a cumulative travelling hours, which is an accumulation of said travelling operation time and;

a cumulative switch ON hours, which is an accumulation of said ON time of said key switch, and;

a cumulative cargo handling hours, which is an accumulation of said time for cargo handling operation, are stored in said operation data storage means, and any one of said distance and hours is selected by said selecting means and indicated by said display means.

* * * * *

UNITED STATES PATENT AND TRADEMARK OFFICE
CERTIFICATE OF CORRECTION

PATENT NO. : 5,065,320
DATED : November 12, 1991
INVENTOR(S) : Takashi Hayashi, et al It is certified that error appears in the above-identified patent and that said Letters Patent is hereby corrected as shown below:

On the Title page, Item [30], Foreign Application Priority Data:

Add:

-- April 30, 1988 [JP] Japan ....... 63-108751--.

Signed and Sealed this

Thirteenth Day of April, 1993

Attest:

STEPHEN G. KUNIN

*Attesting Officer*   *Acting Commissioner of Patents and Trademarks*